(12) United States Patent
Lin et al.

(10) Patent No.: US 10,768,670 B2
(45) Date of Patent: Sep. 8, 2020

(54) CONTROL METHOD, ELECTRONIC DEVICE AND NON-TRANSITORY COMPUTER READABLE RECORDING MEDIUM DEVICE

(71) Applicant: ASUSTeK COMPUTER INC., Taipei (TW)

(72) Inventors: Che-Min Lin, Taipei (TW); Chin-Wen Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/378,764

(22) Filed: Apr. 9, 2019

(65) Prior Publication Data
US 2020/0133348 A1    Apr. 30, 2020

(30) Foreign Application Priority Data

Oct. 29, 2018    (TW) .............................. 107138250 A

(51) Int. Cl.
G06F 3/048    (2013.01)
G06F 1/16    (2006.01)
G06F 3/01    (2006.01)

(52) U.S. Cl.
CPC .......... *G06F 1/1673* (2013.01); *G06F 1/1643* (2013.01); *G06F 1/1647* (2013.01); *G06F 1/1692* (2013.01)

(58) Field of Classification Search
CPC .... G06F 1/1673; G06F 1/1643; G06F 1/1647; G06F 1/1692; G06F 2203/04803
See application file for complete search history.

(56) References Cited

U.S. PATENT DOCUMENTS

| | | | |
|---|---|---|---|
| 8,803,816 B2 | 8/2014 | Kilpatrick, II et al. | |
| 2004/0021681 A1* | 2/2004 | Liao ....................... | G06F 1/1616 715/702 |
| 2006/0034043 A1* | 2/2006 | Hisano ................... | G06F 1/1616 361/679.04 |
| 2008/0225006 A1 | 9/2008 | Ennadi | |

(Continued)

FOREIGN PATENT DOCUMENTS

CN    203287814 U    11/2013
CN    104516627 A    4/2015
(Continued)

*Primary Examiner* — Nicholas Augustine
(74) *Attorney, Agent, or Firm* — McClure, Qualey & Rodack, LLP

(57) ABSTRACT

A control method is provided. The control method is applied to an electronic device. The control method includes the following steps: detecting a virtual screen signal; allocating a virtual screen image buffer module for temporarily storing virtual screen image information according to the virtual screen signal; integrating the virtual screen image information and second screen image information into an integrated image data stream by a direct mode; outputting a first screen image data stream to a first screen of an electronic device, so that the first screen displays a first image according to the first screen image data stream; and outputting the integrated image data stream to a second screen of the electronic device, so that the second screen displays a second image according to the integrated image data stream.

11 Claims, 8 Drawing Sheets

(56) References Cited

U.S. PATENT DOCUMENTS

| | | | |
|---|---|---|---|
| 2013/0057487 A1* | 3/2013 | Yamanaka | G06F 3/0416 |
| | | | 345/173 |
| 2014/0075377 A1* | 3/2014 | Kang | H04M 1/72527 |
| | | | 715/788 |
| 2015/0097869 A1 | 4/2015 | Oh et al. | |
| 2015/0212647 A1* | 7/2015 | Kim | G06F 1/1643 |
| | | | 345/173 |
| 2018/0025469 A1 | 1/2018 | Park | |
| 2019/0325847 A1* | 10/2019 | Kong | G06F 3/04883 |

FOREIGN PATENT DOCUMENTS

| | | |
|---|---|---|
| CN | 106126146 A | 11/2016 |
| CN | 106951202 A | 7/2017 |
| TW | 200910167 A | 3/2009 |
| TW | 201024977 A | 7/2010 |

* cited by examiner

US 10,768,670 B2

CONTROL METHOD, ELECTRONIC DEVICE AND NON-TRANSITORY COMPUTER READABLE RECORDING MEDIUM DEVICE

CROSS-REFERENCE TO RELATED APPLICATION

This application claims the priority benefit of Taiwan Application Serial No. 107138250, filed on Oct. 29, 2018. The entirety of the above-mentioned patent application is hereby incorporated by reference herein and made a part of the specification.

BACKGROUND OF THE INVENTION

Field of the Invention

The invention relates to a control method, an electronic device and a non-transitory computer readable recording medium device.

Description of the Related Art

In recent years, dual-screen output system is gradually applied to various electronic devices to provide better user experiences. For an instance, one of the screens is conducted as an extension screen of a main screen in a notebook computer with a dual-screen output system. However, it is incapable of providing multiple application modes for the user to apply to different situations currently. In addition, in the notebook computer with the conventional dual-screen output system, effective interaction is not realized between the two screens, resulting in tedious transmission procedure and low touch-responsive efficiency, which decreases the overall performance.

BRIEF SUMMARY OF THE INVENTION

According to the first aspect of the disclosure, an electronic device is provided herein. The electronic device includes a first screen, displaying a first image according to a first screen image data stream; a second screen, displaying a second image according to an integrated image data stream; a virtual screen module, generating a virtual screen signal; and a processor, allocating a virtual screen image buffer module according to the virtual screen signal to temporarily store virtual screen image information, wherein the processor integrates the virtual screen image information and second screen image information into the integrated image data stream by a direct mode, and outputs the first screen image data stream and the integrated image data stream.

According to the second aspect of the disclosure, a control method applied to an electronic device is provided herein. The control method includes: detecting a virtual screen signal; allocating a virtual screen image buffer module according to the virtual screen signal to temporarily store virtual screen image information; integrating the virtual screen image information and second screen image information into an integrated image data stream by a direct mode; outputting a first screen image data stream to a first screen of the electronic device, so that the first screen displays a first image according to the first screen image data stream; and outputting the integrated image data stream to a second screen of the electronic device, so that the second screen displays a second image according to the integrated image data stream.

According to the third aspect of the disclosure, a non-transitory computer readable storage medium is provided herein. The computer readable recording medium device stores a program command. After the program command is loaded on an electronic device, the electronic device performs steps of: detecting a virtual screen signal; allocating a virtual screen image buffer module according to the virtual screen signal to temporarily store virtual screen image information; integrating the virtual screen image information and second screen image information into an integrated image data stream by a direct mode; outputting a first screen image data stream to a first screen of the electronic device, so that the first screen displays a first image according to the first screen image data stream; and outputting the integrated image data stream to a second screen of the electronic device, so that the second screen displays a second image according to the integrated image data stream.

The detailed descriptions of other effects and embodiments of the invention are provided below with reference to the accompanying drawings.

BRIEF DESCRIPTION OF THE DRAWINGS

To more clearly describe the technical solutions in the embodiments of this application or in the prior art, the following will briefly introduce the drawings required for describing the embodiments or the prior art. It is apparent that the drawings in the following description are only some embodiments described in this application, and a person of ordinary skill in the art may obtain other drawings on the basis of these drawings without any creative effort.

DETAILED DESCRIPTION OF THE EMBODIMENTS

Figure 1:
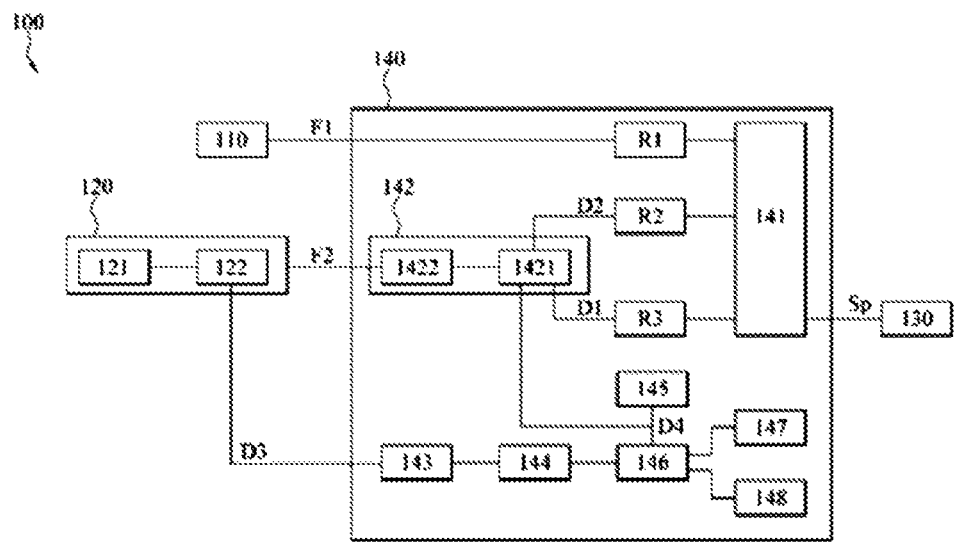
FIG. 1 is a block general schematic diagram of an embodiment of an electronic device.

Please refer to FIG. 1 to FIG. 8, the control method of any embodiment of the invention is implemented in an electronic device 100, so that the electronic device 100 is effectively switched to various application modes, for providing user various operating experience of electronic device 100. The electronic device 100 includes a first machine body 101, a second machine body 102, a virtual screen module 130 and a processor 140, wherein the first machine body 101 includes a first screen 110, and the second machine body 102 includes a second screen 120. In one embodiment, the first machine body 101 and the second machine body 102 are connected with each other by a hinge. In some embodiments, the virtual screen module 130 and the processor 140 are integrated in the first machine body 101 or the second machine body 102. In this embodiment, the virtual screen module 130 and the processor 140 are integrated in the first machine body 101, but the invention is not limited thereto.

In an embodiment, the first screen 110 is a display screen while the second screen 120 is a touch display screen, and the user performs various touch behaviors via the second screen 120, but the invention is not limited thereto. In other embodiment, the first screen 110 and the second screen 120 are both touch display screens, so that the user performs various touch behaviors via the first screen 110 and the second screen 120.

In an embodiment, the first screen 110 displays a first image I1 according to a first screen image data stream F1. In some embodiments, the first image I1 includes a user interface and interface such as desktop, folder, icons of application programs, system taskbar W1, graphic display in execution of application programs, graphic display of touch operation, graphic display of key input or a combination thereof, but the invention is not limited thereto.

In an embodiment, the second screen 120 displays a second image I2 according to an integrated image data stream F2. The processor 140 is coupled to the first screen 110 and the second screen 120. The processor 140 determines that the electronic device 100 has two displays currently by detecting screen signals from the first screen 110 and the second screen 120.

The virtual screen module 130 is coupled to the processor 140. Actually, the virtual screen module 130 cannot displaying images, but the virtual screen module 130 still generates a virtual screen signal Sp to the processor 140, so that the processor 140 determines that a third display is existing in the electronic device 100 according to the virtual screen signal Sp.

In some embodiments, the types of the virtual screen module 130 and the virtual screen signal are determined according to a transmission interface adopted by the processor 140. In an embodiment, the virtual screen module 130 is a microprogrammed control unit (MCU), and the processing circuit 140 determines that a third display is existing according the virtual screen signal Sp generated by a hot plug (HDP) signal of a general purpose input/output interface (GPIO), an operable embedded display interface (eDP), a display interface (DP) or a high-definition multimedia (HDMI) interface. In an embodiment, the virtual screen signal Sp contains resolution information. In another embodiment, the virtual screen module 130 is a scaler, and the processor 140 determines that a third display is existing according to the virtual screen signal Sp generated by the high-definition multimedia interface or a video graphic array (VGA or D-sub) interface. In further another embodiment, the virtual screen module 130 is simulated by a driver.

Figure 2:
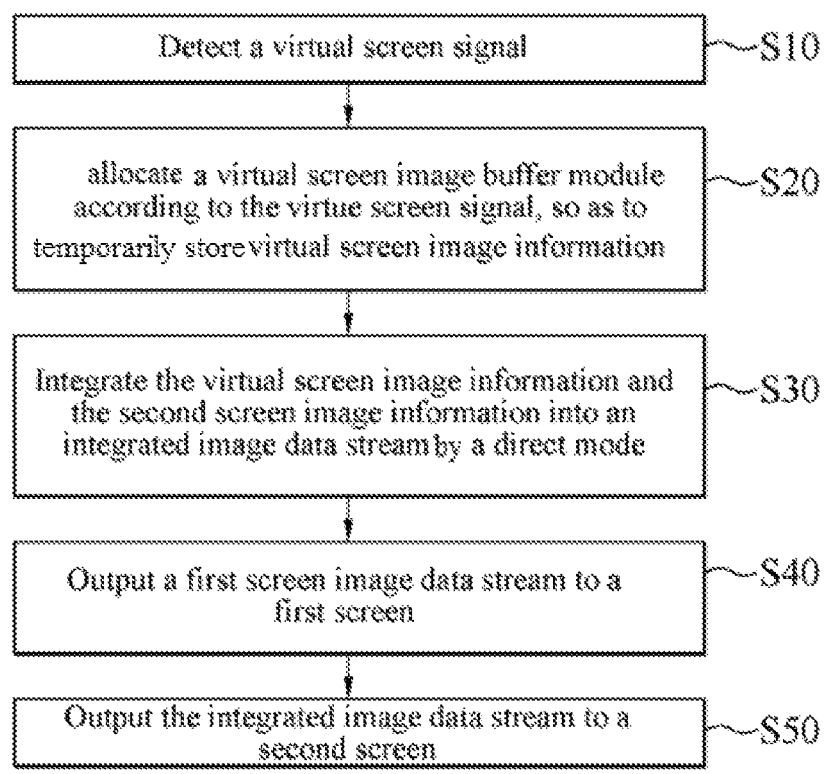
FIG. 2 is a flow schematic diagram of an embodiment of a control method.

Please refer to FIG. 1 and FIG. 2, in an embodiment of the control method, the processor 140 detects whether the virtual screen signal Sp (step S10) exists. After the virtual screen signal Sp is detected, the processor 140 allocates the virtual screen image buffer module R3 according to the virtual screen signal Sp to temporarily store virtual screen image information D1 (step S20). Furthermore, the processor 140 obtains the virtual screen image information D1 from the virtual screen image buffer module R3, and integrates the virtual screen image information D1 and second screen image information D2 into an integrated image data stream F2 by a direct mode (step S30). Afterward, the processor 140 outputs the first screen image data stream F1 to the first screen 110, so that the first screen 110 displays the first image I1 according to the first screen image data stream F1 (step S40), and outputs the integrated image data stream F2 to the second screen 120, so that the second screen 120 displays the second image I2 according to the integrated image data stream F2 (step S50).

In some embodiments, the processor 140 includes a processing module 141 and an integration module 142. In an embodiment of step S20, the processor 140 allocates the virtual screen image buffer module R3 by the processing module 141 according to the virtual screen signal Sp. Moreover, the processing module 141 further allocates a first image buffer module R1 according to a screen signal of the first screen 110, and allocates a second screen image buffer module R2 according to the screen signal of the second screen 120. The first image buffer module R1 is configured to temporarily store the first screen image data stream F1. The second screen image buffer module R2 is configured to temporarily store the second screen image information D2. The virtual screen image buffer module R3 is configured to temporarily store the virtual screen image information D1.

In an embodiment of step S40, the processor 140 outputs the first screen image data stream F1 from the first image buffer module R1 to the first screen 110 by the processing module 141, so that the first screen 110 displays a corresponding first image I1 according to the first screen image data stream F1.

In an embodiment of step S30 and step S50, the processor 140 integrates the virtual screen image information D1 and the second screen image information D2 into the integrated image data stream F2 by a direct mode by the integration module 142 according to the interface layout information D4 of the second screen 120, and outputs the integrated image data stream F2 to the second screen 120. It is to be understood that, the direct mode here refers to an image processing and outputting mode that directly controlled by software instead of a general operating system. In some embodiments, the integration module 142 contains an integration program 1421 and an output driver 1422. The integration program 1421 is configured to integrate the virtual screen image information D1 and the second screen image information D2 into the integrated image data stream F2 by a direct mode according to the interface layout information D4 of the second screen 120, and then the integration program 1421 directly outputs the integrated image data stream F2 from the output driver 1422 to the second screen 120, so that the second screen 120 displays the second image I2 according to the integrated image data stream F2. It is to be understood that, the direct mode here refers to an image processing and outputting mode that directly controlled by software instead of a general operating system.

Herein, the interface layout information D4 of the second screen 120 is regional configuration information in user interface configuration of the second screen 120. The interface layout information D4 of the second screen 120 has different regional configurations according to different application modes of the electronic device 100.

In some embodiments, the interface layout information D4 of the second screen 120 includes a virtual keyboard region A1, a virtual touchpad region A2, an extension display region A3 or a combination thereof. In one embodiment, a keyboard image covering multiple keys is displayed in the virtual keyboard region A1, so that the user knows that each touch position in the virtual keyboard region A1 is corresponding to which symbols or functions. An image representing a touchpad is displayed in the virtual touchpad region A2 to notice user that he/she can perform the touchpad operation in the virtual touchpad region A2. The extension display region A3 is freely used by the user as an extension display screen of the first screen 110.

In some embodiments, the virtual screen image information D1 is image information of an extension picture of the first screen 110, and the second screen image information D2 is image information of a virtual keyboard and/or a virtual touchpad. In addition, the application mode of the electronic device 100 includes a general notebook computer mode, a notebook computer multiplex mode, a panorama mode, a panorama multiplex mode and a book mode, which is not limited thereto.

Figure 3:
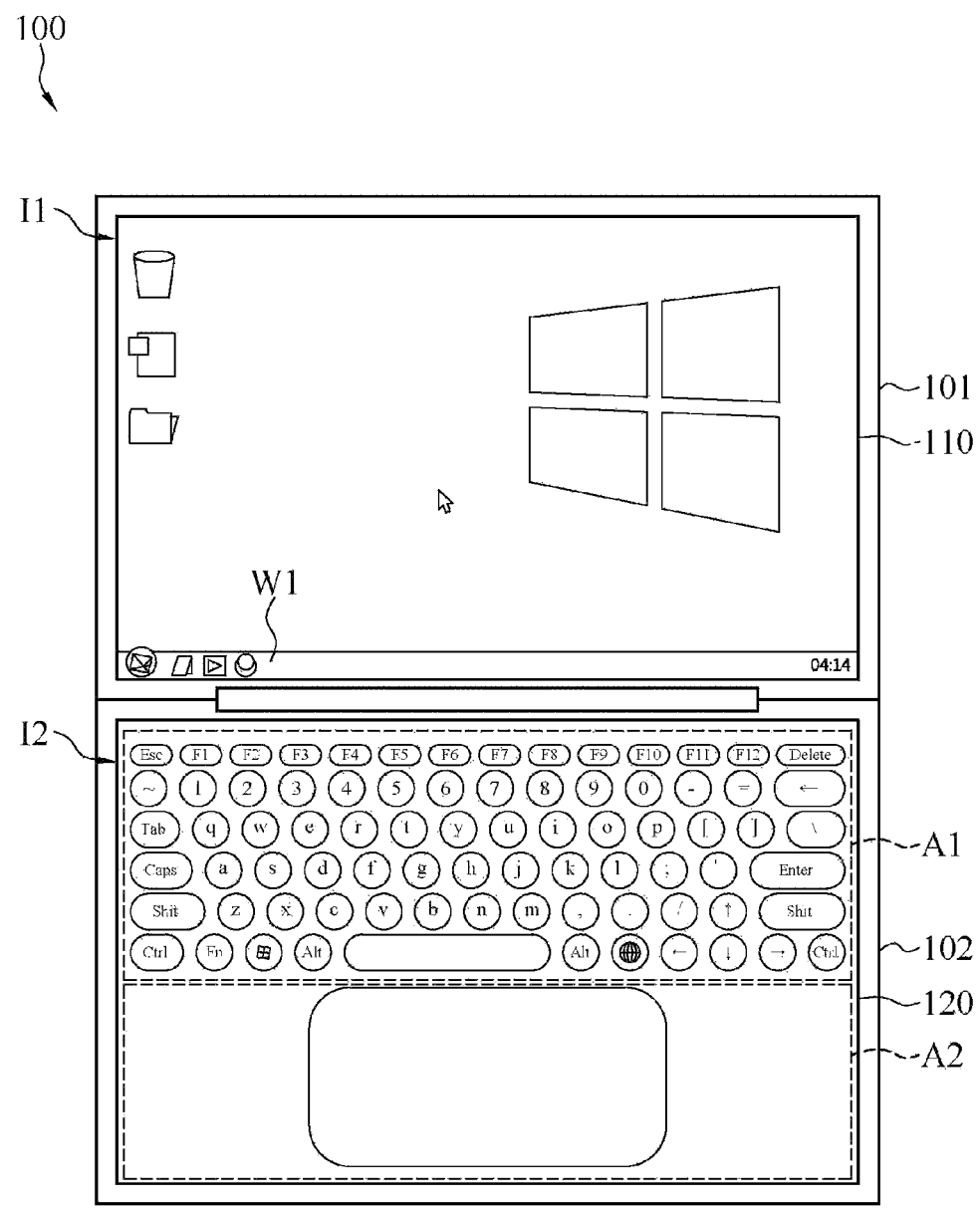
FIG. 3 is a general schematic diagram of an embodiment when the electronic device is operated in a general notebook computer mode.

Please refer to FIG. 1 and FIG. 3, in this embodiment, the application mode is the general notebook computer mode, the interface layout information D4 of the second screen 120 of the electronic device 100 contains the virtual keyboard region A1 and the virtual touchpad region A2. Furthermore, the integration module 142 of the processor 140 takes the second screen image information D2 as the integrated image data stream F2 and outputs the integrated image data stream F2 to the second screen 120, wherein the second screen image information D2 is generated by a direct mode and having the virtual keyboard and the virtual touchpad. Therefore, the second image 12 with the virtual keyboard and the virtual touchpad is displayed on the second screen 120. It is to be understood that, the direct mode here refers to an image processing and outputting mode directly controlled by software instead of a general operating system.

In the general notebook computer mode, when the user touches a key displayed on the virtual keyboard region A1, the electronic device 100 outputs the character or key function corresponding to the key displayed on the virtual keyboard region A1. In addition, at least one of the cursor displayed in the first screen 110, the application program, the rolling function or zooming function is controlled by performing operations such as clicking, sliding or the like on the virtual touchpad region A2.

Figure 4:
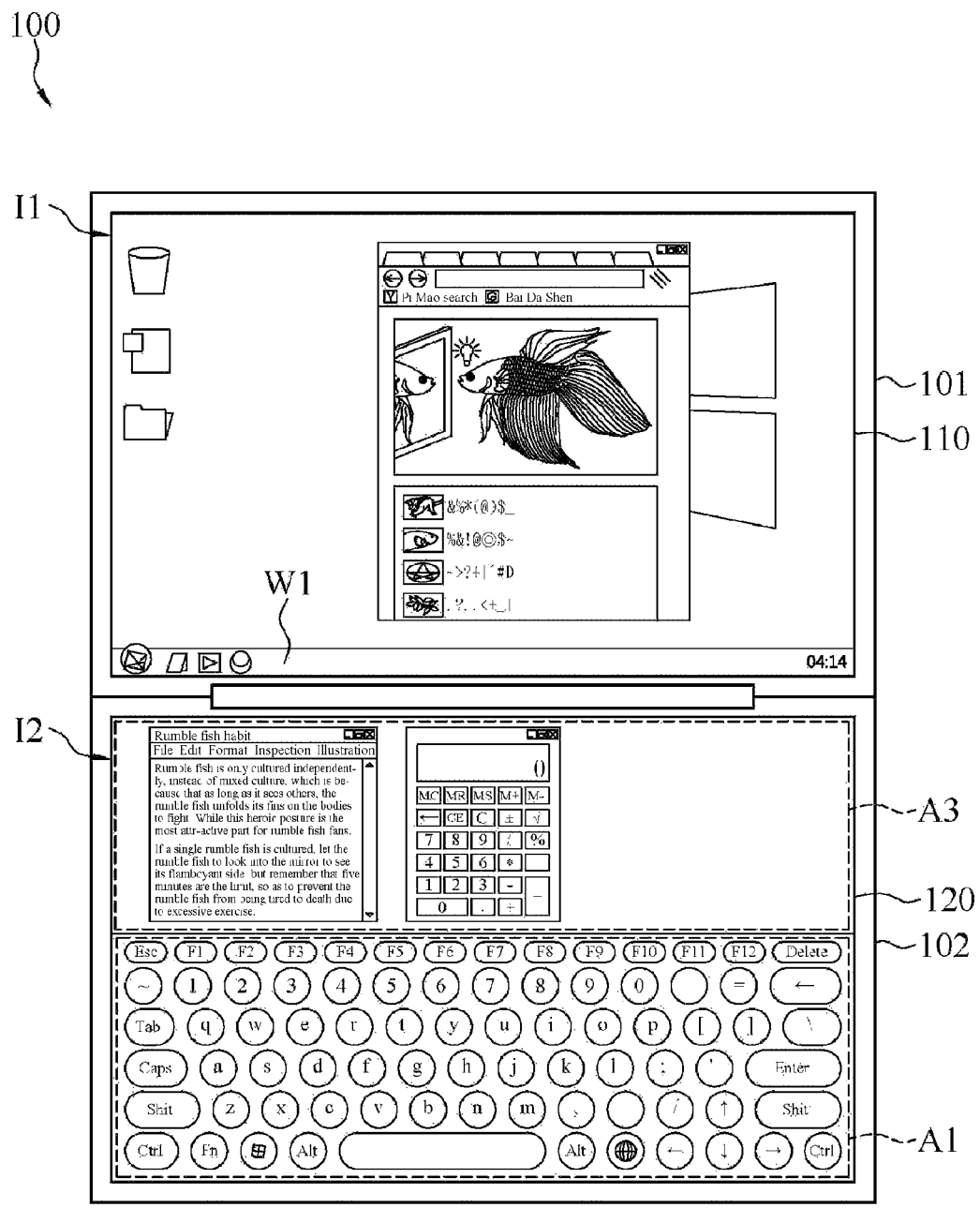
FIG. 4 is a general schematic diagram of an embodiment when the electronic device is operated in a notebook computer multitask mode.

Please refer to FIG. 1 and FIG. 4, when the application mode is the notebook computer multiplex mode, the interface layout information D4 of the second screen 120 of the electronic device 100 contains the virtual keyboard region A1 and the extension display region A3. According to the interface layout information D4, the integration module 142 of the processor 140 integrates the second screen image information D2 with the virtual keyboard and the virtual screen image information D1 with the extension picture of the first screen 110 into the integrated image data stream F2 by a predetermined display proportion and a direct mode and outputs the integrated image data stream F2 to the second screen 120, so that the second image 12 with the virtual keyboard and the extension picture is displayed on the second screen 120. In other embodiment, the interface layout information D4 of the second screen 120 contains the virtual touchpad region A2 and the extension display region A3. According to the interface layout information D4, the integration module 142 integrates the second screen image information D2 with the virtual touchpad and the virtual screen image information D1 with the extension picture of the first screen 110 into the integrated image data stream F2 by a predetermined display proportion and a direct mode and then outputs the integrated image data stream F2 to the second screen 120 by a direct mode, so that the second image 12 with the virtual touchpad and the extension picture is displayed on the second screen 120.

Therefore, in the notebook computer multiplex mode, the different works are executed on the first screen 110 and the extension regions A3 of the second screen 120 at the same time. Moreover, the user changes the integration proportion of the integration module 142 for integrating the virtual screen image information D1 and the second screen image information D2 by interface adjustment setting, so as to adjust the proportion of the extension display region A3 on the second screen 120 and the proportion of the virtual keyboard region A1 on the second screen 120.

Figure 5:
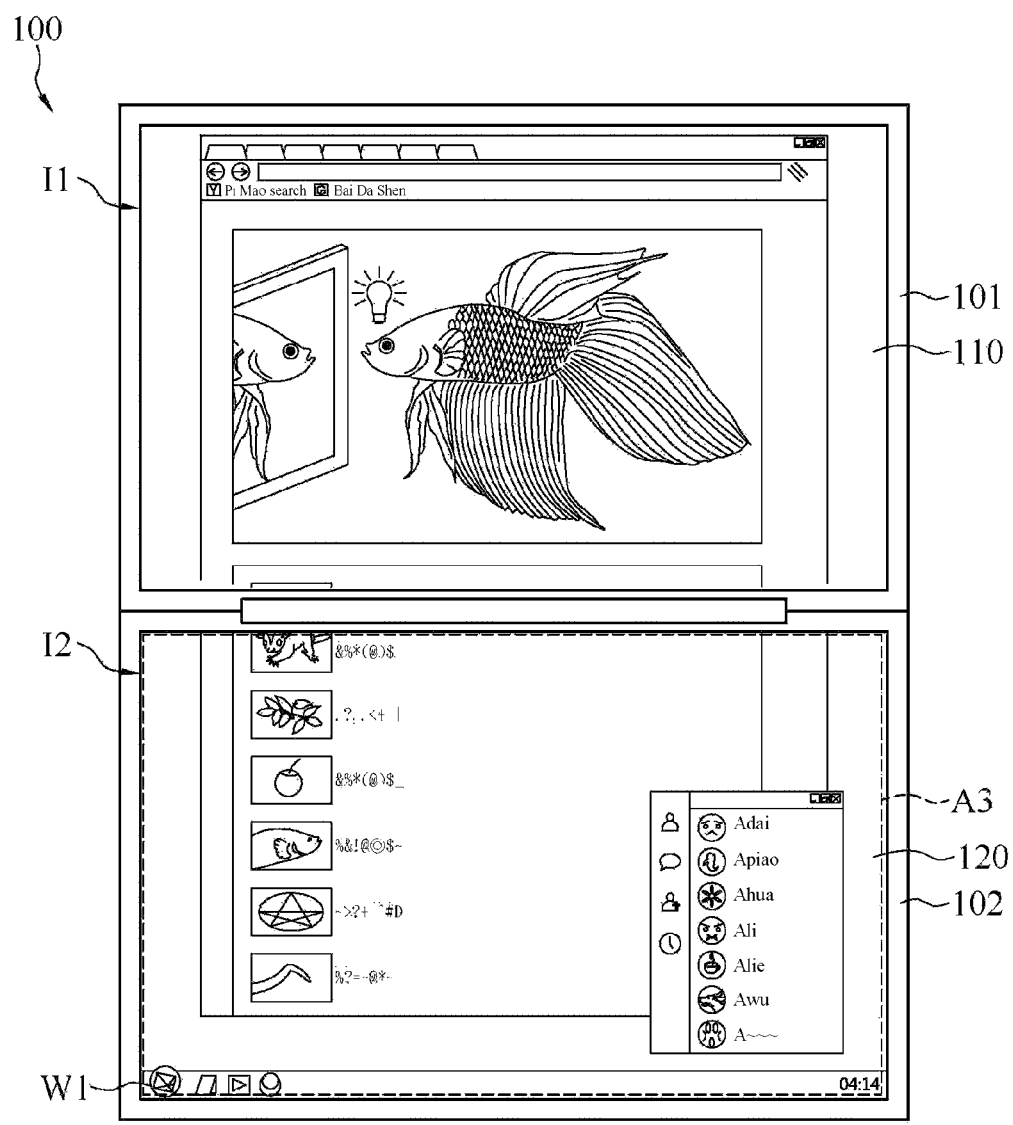
FIG. 5 is a general schematic diagram of an embodiment when the electronic device is operated in a panorama mode.

Please refer to FIG. 1 and FIG. 5, when the application mode is the panorama mode, the interface layout information D4 of the second screen 120 of the electronic device 100 only contains the extension display region A3. Furthermore, the integration module 142 of the processor 140 takes the virtual screen image information D1 with the extension picture of the first screen 110 as the integrated image data stream F2 according to the interface layout information D4 and outputs the integrated image data stream F2 to the second screen 120 by a direct mode, so that the second image 12 with an extension picture is displayed on the second screen 120.

In one embodiment, when the electronic device 100 is in the panorama mode, the whole second screen 120 is taken as an extension screen of the first screen 110. Furthermore, the first screen 110 and the second screen 120 jointly display a single work, so that the display scope of the single work is expanded. In this embodiment, the system taskbar W1 is displayed in the second screen 120.

Figure 6:
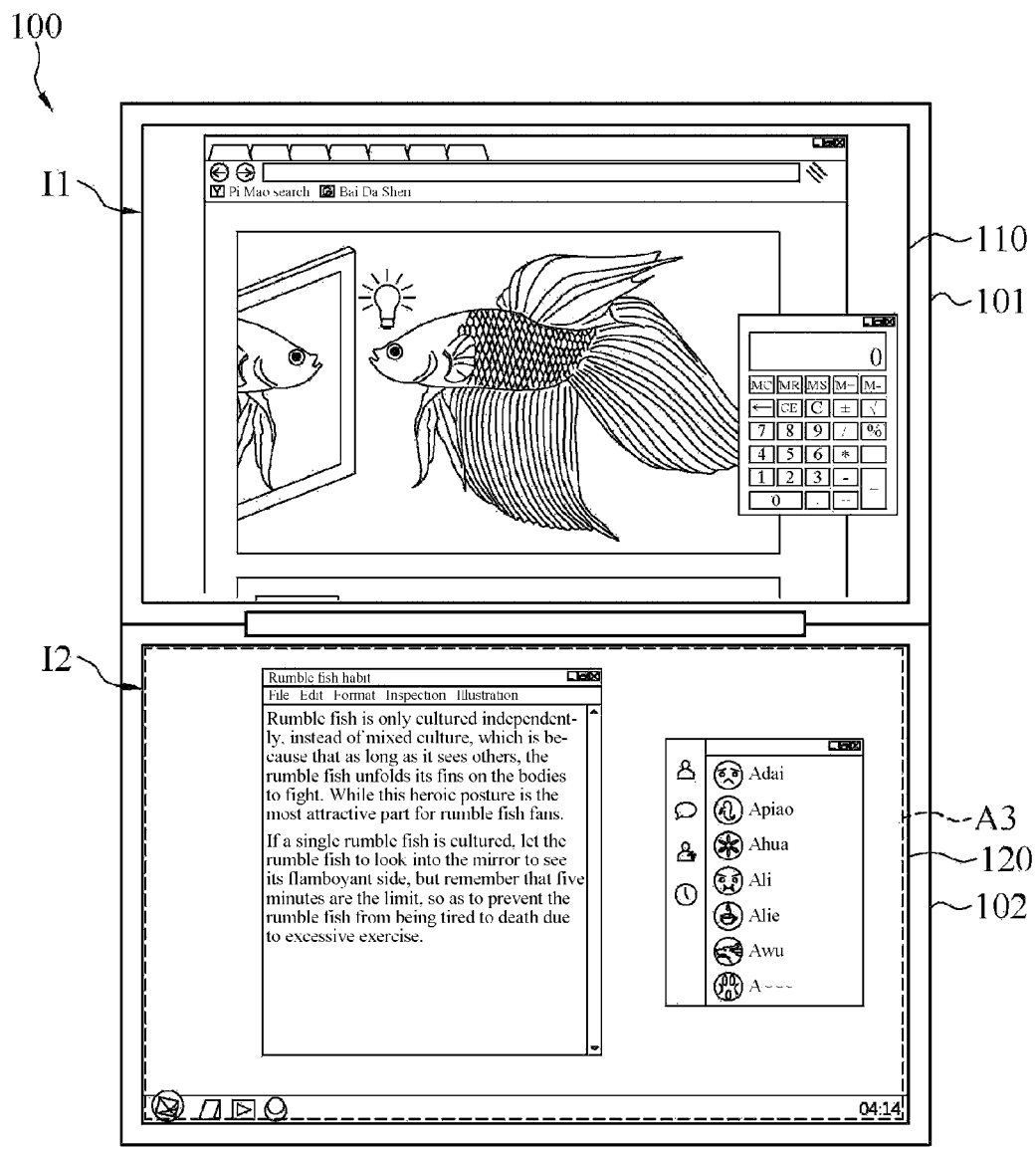
FIG. 6 is a general schematic diagram of an embodiment when the electronic device is operated in a panorama multitask mode.

Please refer to FIG. 1 and FIG. 6, when the application mode is the panorama multiplex mode, the interface layout information D4 of the second screen 120 of the electronic device 100 only contains the extension display region A3. Furthermore, the integration module 142 of the processor 140 takes the virtual screen image information D1 with the extension picture of the first screen 110 as the integrated image data stream F2 according to the interface layout information D4 and outputs the integrated image data stream F2 to the second screen 120 by a direct mode, so that the second image 12 with an extension picture is displayed on the second screen 120. In other embodiment, when the application mode is in the panorama multiplex mode, the first screen 110 and the second screen 120 respectively display different work simultaneously, so that the user processes different work at the same time.

Figure 7:
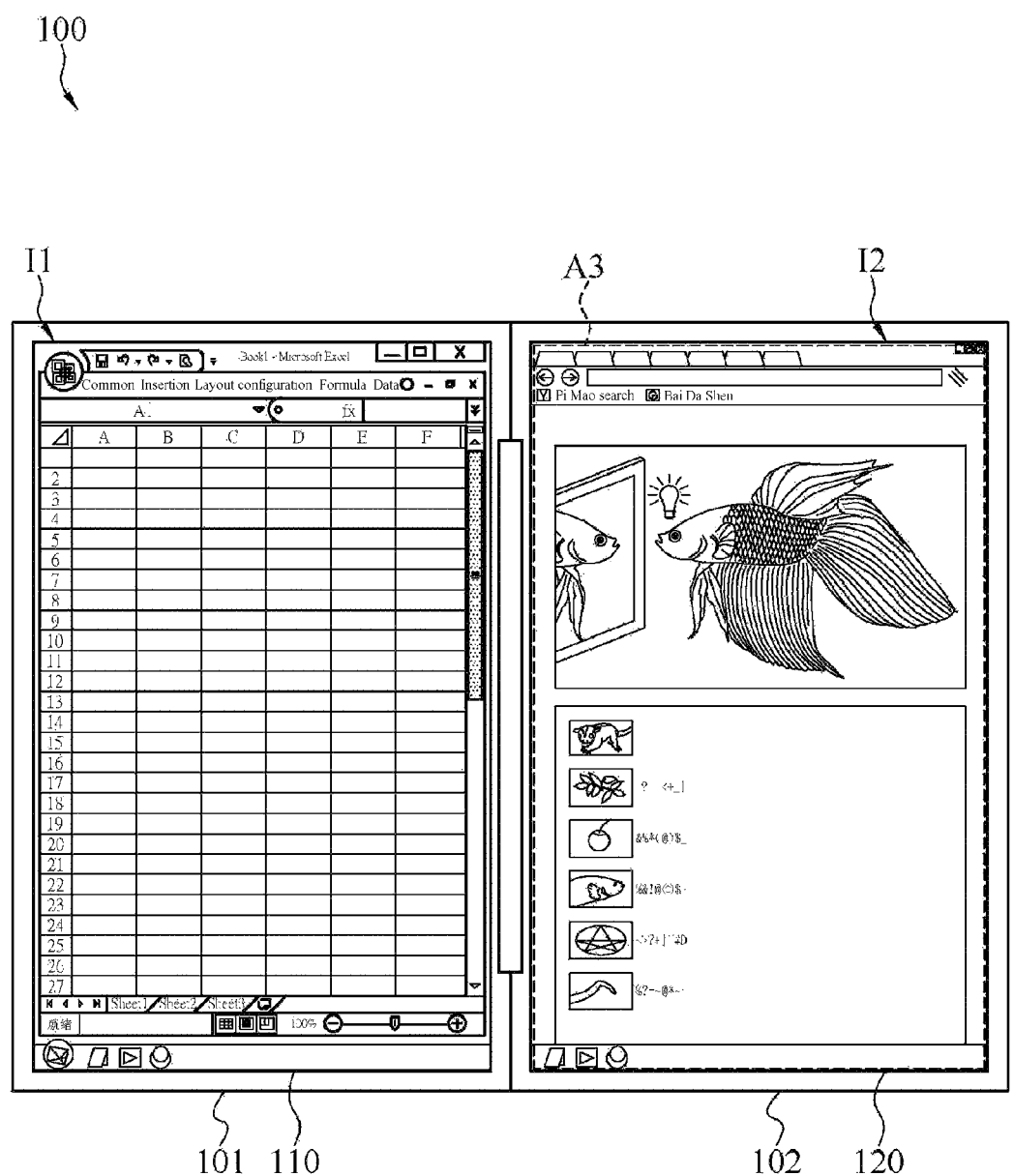
FIG. 7 is a general schematic diagram of an embodiment when the electronic device is operated in a book mode.

Please refer to FIG. 1 and FIG. 7, when the application mode is the book mode, the interface layout information D4 of the second screen 120 of the electronic device 100 only contains the extension display region A3. Furthermore, the integration module 142 of the processor 140 takes the virtual screen image information D1 with the extension picture of the first screen 110 as the integrated image data stream F2 according to the interface layout information D4 and outputs the integrated image data stream F2 to the second screen 120 by a direct mode, so that the second image 12 with an extension picture is displayed on the second screen 120. In one embodiment, when the application mode is in the book mode and the electronic device 100 is horizontally rotated by 90 degrees, the pictures displayed in the first screen 110 and the second screen 120 are correspondingly adjusted according to the rotated direction of the electronic device 100. Herein, the FIG. 7 is drawn by taking the situation that the electronic device 100 is rotated by 90 degrees leftwards as an example, but the disclosure is not limited thereto.

Figure 8:
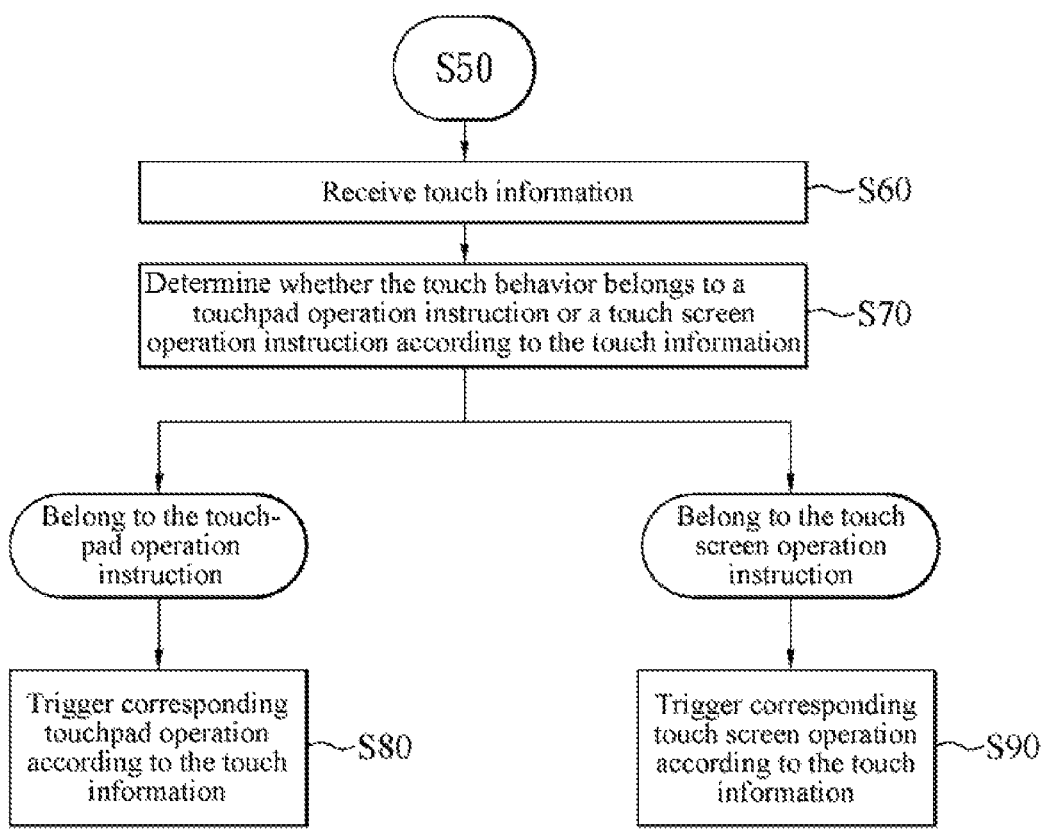
FIG. 8 is a flow schematic diagram of another embodiment of the control method.

Please refer to FIG. 1 and FIG. 8, in some embodiments, the second screen 120 generates touch information D3 responding to the touch behavior of the user. The second screen 120 includes a touch information capture module 121 and a transmission control module 122. The touch information capture module 121 is configured to capture the touch information D3 according to the touch behavior of the user, and the transmission control module 122 is configured to transmit the touch information D3 to the processor 140. In an embodiment, the touch information D3 contains at least one of coordinate information or strength information of the touch point. Therefore, when performing subsequent operation, the processor 140 determines the touch position and strength of the user according to the touch information D3 so as to perform corresponding operation.

In some embodiments, the transmission control module 122 transmits the touch information to the processor 140 by various wired or wireless communication interfaces such as an I2C interface, a USB interface, a wireless universal serial bus (WUSB), Bluetooth and the like, but the disclosure is not limited thereto.

In an embodiment of the control method, the processor 140 receives the touch information D3 which is responding to the touch behavior of the user and generated by the second screen 120 (step S60), and determines whether the touch behavior of the user belongs to the touchpad operation instruction or the touch screen operation instruction according to the touch information D3 (step S70). When the processor 140 determines that the touch behavior belongs to the touchpad operation instruction, the processor 140 triggers corresponding touchpad operation according to the touch information D3 (step S80). When the processor 140 determines that the touch behavior belongs to the touch screen operation instruction, the processor 140 triggers corresponding touch screen operation according to the touch information D3 (step S90).

In step S60, the processor 140 includes a driver module 143, and the processor 140 receives the touch information D3 by the driver module 143. Moreover, the processor 140 further includes a capture program module 144, and the processor 140 captures the input characteristic from the touch information D3 by the capture program module 144 for subsequent operation. In some embodiments, the captured input characteristics include input position, package quantity, sliding distance, sliding time, clicking time interval or a combination thereof, but the disclosure is not limited thereto, and the input characteristics are any parameters applicable to assisting subsequent determination.

In step S70, the processor 140 further includes an interface setting module 145 and a determination module 146. The interface setting module 145 is configured to generate interface layout information D4 of the second screen 120. Furthermore, the determination module 146 is configured to determine whether the touch behavior belongs to the touchpad operation instruction or the touch screen operation instruction according to the interface layout information D4 and the touch information D3.

In some embodiments, the determination module 146 determines whether the touch behavior belongs to the touchpad operation instruction or the touch screen operation instruction according to which region of the interface layout information D4 that the input position of the touch information D3 is located on. In some embodiments, when the input position of the touch information D3 is located on the touchpad operation region or the key operation region, the determination module 146 determines that the touch behavior belongs to the touchpad operation instruction. When the input position of the touch information D3 is located on the extension display region, the determination module 146 determines that the touch behavior belongs to the touch screen operation instruction.

In an embodiment of step S80, the processor 140 further includes a touchpad information processing module 147. After the determination module 146 determines that the touch behavior belongs to the touchpad operation instruction, the determination module 146 directly outputs the touch information D3 or the input characteristics captured from the touch information D3 by the capture program module 144 to the touchpad information processing module 147, and the touchpad information processing module 147 outputs the touch information D3 or the input characteristics to an operating system to perform corresponding touchpad operation. Herein, the touchpad operation performs touch positioning by relative position.

In some embodiments, when the input position of the touch information D3 is located on the touchpad operation region, the touchpad operation instruction includes a track operation instruction, a clicking input instruction or the like, but the disclosure is not limited thereto. By taking the track operation instruction as an example, the relationship between the track operation instruction and the corresponding touchpad operation includes: a cursor displayed by the first screen 110 or the second screen 120 is moved when a single-finger sliding instruction is performed on touchpad operation region, or the picture displayed on the first screen 110 or the second screen 120 is rolled or zoomed when a double-finger sliding operation is performed on the touchpad operation region. By taking the clicking input instruction as an example, the relationship between the clicking input instruction and the corresponding touch operation includes: when a click input instruction or double click input instruction is performed on the touchpad operation region, the application program displayed on the first screen 110 or the second screen 120 is clicked. When the input position of the touch information D3 is located on the touch key operation region, the relationship between the touchpad operation instruction and the corresponding touchpad operation includes: when the touchpad operation instruction is performed on the touch key operation region, the first screen 110 or the second screen 120 is triggered to display corresponding characters or key functions, but the disclosure is not limited thereto.

In some embodiments, the operating system executes touch operation by corresponding inbox driver, such as a Windows precision touchpad driver.

In an embodiment of step S90, the processor 140 further includes a touch screen information processing module 148, and after the determination module 146 determines that the touch behavior belongs to the touch screen operation instruction, the determination module 146 directly outputs the touch information D3 or the input characteristics captured from the touch information D3 by the capture program module 144 to the touch screen information processing module 148, and then the touch screen information processing module 148 outputs the touch information D3 or the input characteristics to an operating system to perform corresponding touch screen operation. Herein, the touch screen operation performs touch positioning by an absolute position.

In some embodiments, the relationship between the touch screen operation instruction and the corresponding touch screen operation includes: the application program displayed on the first screen 110 or the second screen 120 is clicked when the single click operation instruction or the double clock operation instruction is performed, or the interface displayed on the first screen 110 or the second screen 120 is slid when a sliding operation instruction is performed, or the picture displayed on the first screen 110 or the second screen 120 is zoomed when a zooming operation instruction is performed, but the disclosure is not limited thereto.

In some embodiments, the control method of any embodiment of the invention is a non-transitory computer readable recording medium device. The non-transitory computer readable recording medium device stores at least one program, so that after the program command is loaded on an electronic device, the electronic device performs the control method of any of the above-mentioned control methods. In an embodiment, the non-transitory computer readable recording medium device is a memory in the electronic device 100. In some embodiments, the memory is one or more storage elements, and the storage elements are, but not limited to, non-volatile memories, including read-only memory (ROM) or flash memory, or volatile memory, including random access memory (RAM). In another embodiment, the non-transitory computer readable recording medium device is a remote storage element, and transmits to the electronic device 100 in a wired or wireless manner. In further another embodiment, the non-transitory computer readable recording medium device is a memory outside the electronic device 100, and the program code of the storage element is connected and accessed by a reader or a connector of the electronic device 100.

In some embodiments, the processor 140 is an SoC wafer, a central processing unit (CPU), a microprogrammed control unit (MCU) or an application-specific integrated circuit (ASIC) and the like. Moreover, at least one of the first screen 110 or the second screen 120 is a capacitive touch display screen, a resistive touch display screen or other touch display screens made by using proper touch sensing elements.

To sum up, the control method, in the disclosure, the processor provides a virtual screen image buffer module for temporarily storing virtual screen image information according to a virtual screen signal, and the processor integrates the virtual screen image information and the second screen image information into an integrated image data stream and then outputs the integrated image data stream to the second screen to be displayed, so as to provide various application modes for the user to select. Moreover, the determination module determines whether the touch behavior belongs to the touchpad operation instruction or the touch screen operation instruction according to the touch information and then executes the corresponding touchpad operation or touch screen operation by one operating system, so that the touch information transmission flow is simplified and the transmission efficiency is promoted, and according to the disclosure, only one operating system is needed to realize intercommunication between two screens.

The above-described embodiments and/or implementations are merely illustrative of preferred embodiments and/or implementations for practicing the techniques of the invention, and are not intended to limit the embodiments of the techniques of the invention in any manner, and any person skilled in the art may make various variations or modifications to obtain other equivalent embodiments without departing from the scope of the technical means disclosed herein, and all such embodiments should still be considered to be substantially the same techniques or embodiments as the invention.

What is claimed is:

1. An electronic device, comprising:
a first screen, displaying a first image according to a first screen image data stream; a second screen, displaying a second image according to an integrated image data stream; a virtual screen module, generating a virtual screen signal; and a processor, allocating a virtual screen image buffer module according to the virtual screen signal to temporarily store virtual screen image information,
wherein the processor integrates the virtual screen image information comprising image information of an extension picture of the first screen and second screen image information comprising image information of a virtual inputting-tool into the integrated image data stream according to an interface layout information by a direct mode comprising an image processing and outputting mode directly controlled by software rather than by a general operating system, and outputs the first screen image data stream to the first screen and the integrated image data stream to the second screen so that the first image is displayed on the first screen and the second image with the virtual inputting-tool and the extension picture is displayed on the second screen at the same time, wherein the processor integrates the virtual screen image information and second screen image information into the integrated image data stream according to an adjustable integration proportion such that a proportion of the extension picture region on the second screen and a proportion of the virtual inputting tool on the second screen are set according to the adjustable integration proportion.

2. The electronic device according to claim 1, wherein the processor comprises:
a processing module, configuring a first image buffer module, a second screen image buffer module and the virtual screen image buffer module, wherein the first image buffer module is configured to temporarily store the first screen image data stream, the second screen image buffer module is configured to temporarily store the second screen image information, and the processing module outputs the first screen image data stream from the first image buffer module to the first screen; and
an integration module, integrating the virtual screen image information and the second screen image information into the integrated image data stream according to interface layout information of the second screen, and output the integrated image data stream to the second screen.

3. The electronic device according to claim 2, wherein the interface layout information comprises an extension display region, a virtual keyboard region, a virtual touchpad region or a combination thereof.

4. The electronic device according to claim 2, wherein the second screen is further configured to generate touch information responding to a touch behavior, the processor is further configured to determine whether the touch behavior belongs to a touchpad operation instruction or a touch screen operation instruction according to the touch information, when the touch behavior belongs to the touchpad operation instruction, a processor triggers corresponding touchpad operation according to the touch information, and when the touch behavior belongs to the touch screen operation instruction, the processor triggers corresponding touch screen operation according to the touch information.

5. The electronic device according to claim 4, wherein the processor comprises:
an interface setting module, generating the interface layout information; and
a determination module, determining whether the touch behavior belongs to the touchpad operation instruction or the touch screen operation instruction according to the touch information and the interface layout information.

6. A control method, applied to an electronic device, comprising the following steps: detecting a virtual screen signal; allocating a virtual screen image buffer module according to the virtual screen signal to temporarily store virtual screen image information; integrating the virtual screen image information comprising image information of an extension picture of the first screen and second screen image information comprising image information of a virtual inputting-tool into an integrated image data stream according to an interface layout information by a direct mode comprising an image processing and outputting mode directly controlled by software rather than by a general operating system;
outputting a first screen image data stream to a first screen of the electronic device, so that the first screen displays a first image according to the first screen image data stream; and
outputting the integrated image data stream to a second screen of the electronic device, so that the second screen displays a second image according to the integrated image data stream, wherein the first image is displayed on the first screen and the second image with the virtual inputting-tool and the extension picture is displayed on the second screen at the same time and
wherein the virtual screen image information and second screen image information are integrated into the integrated image data stream according to an adjustable integration proportion such that a proportion of the extension picture region on the second screen and a proportion of the virtual inputting tool on the second screen are set according to the adjustable integration proportion.

7. The control method according to claim 6, wherein the integration step further comprising:
integrating the virtual screen image information and the second screen image information into the integrated image data stream according to the interface layout information of the second screen.

8. The control method according to claim 7, wherein the interface layout information comprises an extension display region, a virtual keyboard region, a virtual touchpad region or a combination thereof.

9. The control method according to claim 6, further comprising:
receiving touch information which is responding to the touch behavior and generated by the second screen;
determining whether the touch behavior belongs to a touchpad operation instruction or a touch screen operation instruction according to the touch information;
triggering corresponding touchpad operation according to the touch information when the touch behavior belongs to the touchpad operation instruction; and
triggering corresponding touch screen operation according to the touch information when the touch behavior belongs to the touch screen operation instruction.

10. The control method according to claim 9, wherein the determining step further comprising:
determining whether the touch behavior belongs to the touchpad operation instruction or the touch screen operation instruction according to the touch information and the interface layout information.

11. A non-transitory computer readable recording medium device, configured to store a program command, after the program command is loaded on an electronic device, the electronic device performs steps of:
detecting a virtual screen signal;
allocating a virtual screen image buffer module for temporarily storing virtual screen image information according to the virtual screen signal;
integrating the virtual screen image information comprising image information of an extension picture of the first screen and second screen image information comprising image information of a virtual inputting-tool into an integrated image data stream according to an interface layout information by a direct mode comprising an image processing and outputting mode directly controlled by software rather than by a general operating system;
outputting a first screen image data stream to a first screen of the electronic device, so that the first screen displays a first image according to the first screen image data stream; and
outputting the integrated image data stream to a second screen of the electronic device, so that the second screen displays a second image according to the integrated image data stream, wherein the first image is displayed on the first screen and the second image with the virtual inputting-tool and the extension picture is displayed on the second screen at the same time and
wherein the virtual screen image information and second screen image information are integrated into the integrated image data stream according to an adjustable integration proportion such that a proportion of the extension picture region on the second screen and a proportion of the virtual inputting tool on the second screen are set according to the adjustable integration proportion.

* * * * *